United States Patent
Bailey, Jr.

(10) Patent No.: US 9,847,995 B2
(45) Date of Patent: Dec. 19, 2017

(54) ADAPTIVE POLICIES AND PROTECTIONS FOR SECURING FINANCIAL TRANSACTION DATA AT REST

(71) Applicant: American Express Travel Related Services Company, Inc., New York, NY (US)

(72) Inventor: Samuel A. Bailey, Jr., Boca Raton, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 152 days.

(21) Appl. No.: 14/933,165

(22) Filed: Nov. 5, 2015

(65) Prior Publication Data

US 2016/0057129 A1 Feb. 25, 2016

Related U.S. Application Data

(63) Continuation of application No. 14/492,771, filed on Sep. 22, 2014, now Pat. No. 9,213,975, which is a (Continued)

(51) Int. Cl.
*G06F 17/30* (2006.01)
*H04L 29/06* (2006.01)
(Continued)

(52) U.S. Cl.
CPC ............ *H04L 63/083* (2013.01); *G06F 21/36* (2013.01); *G06Q 20/322* (2013.01);
(Continued)

(58) Field of Classification Search
CPC ...... G02B 2027/0138; G02B 2027/014; G02B 2027/0178; G02B 27/0093; G02B 27/017;
(Continued)

(56) References Cited

U.S. PATENT DOCUMENTS

| 4,796,025 A | 1/1989 | Farley et al. |
| 5,053,956 A | 10/1991 | Donald et al. |

(Continued)

FOREIGN PATENT DOCUMENTS

| CN | 1269030 | 10/2000 |
| CN | 101189859 | 5/2008 |

(Continued)

OTHER PUBLICATIONS

Selim Aissi et al., "Security for Mobile Networks and Platforms", Artech House Publishers (2006), 329 pages.

(Continued)

*Primary Examiner* — Kambiz Zand
*Assistant Examiner* — Abiy Getachew
(74) *Attorney, Agent, or Firm* — Snell & Wilmer L.L.P.

(57) ABSTRACT

A system, method, and computer-readable medium for challenge-response authentication are provided. A plurality of codes is received over a communication network based on input provided by way of a user interface displaying a plurality of images. An alphanumeric string is generated based on the received plurality of codes and based on a table that associates each one of the plurality of codes with a respective one of the plurality of images and with a respective one of a plurality of alphanumeric characters. A determination is made as to whether to grant authorization based on whether the generated alphanumeric string matches an alphanumeric user identifier stored in a memory device in association with a user.

20 Claims, 6 Drawing Sheets

Related U.S. Application Data continuation of application No. 12/820,193, filed on Jun. 22, 2010, now Pat. No. 8,850,539.

(51) Int. Cl.

| | | |
|---|---|---|
| *G06F 21/36* | (2013.01) | |
| *G06Q 20/32* | (2012.01) | |
| *G06Q 20/40* | (2012.01) | |
| *G09C 1/04* | (2006.01) | |
| *H04L 9/32* | (2006.01) | |
| *G06Q 20/38* | (2012.01) | |

(52) U.S. Cl.
CPC ......... *G06Q 20/325* (2013.01); *G06Q 20/382* (2013.01); *G06Q 20/40* (2013.01); *G06Q 20/4014* (2013.01); *G09C 1/04* (2013.01); *H04L 9/3271* (2013.01); *H04L 63/0428* (2013.01); *H04L 63/08* (2013.01); *H04L 63/10* (2013.01); *H04L 63/1408* (2013.01); *G06F 2221/2103* (2013.01); *H04L 2463/102* (2013.01)

(58) Field of Classification Search
CPC ........... G02B 27/0172; G05D 23/1904; G05D 23/1917; G06K 2007/10504; G06K 7/10009; G06K 7/10326; G06K 9/00013; G06K 9/00288; G06F 21/36; G06F 2221/2103; G06Q 20/322; G06Q 20/325; G06Q 20/382; G06Q 20/40; G06Q 20/4014; G09C 1/04; H04L 2463/102; H04L 63/0428; H04L 63/08; H04L 63/083; H04L 63/10; H04L 63/1408
See application file for complete search history.

(56) References Cited

U.S. PATENT DOCUMENTS

| | | | |
|---|---|---|---|
| 5,784,566 A | | 7/1998 | Viavant et al. |
| 5,796,942 A | | 8/1998 | Esbensen |
| 6,088,450 A | | 7/2000 | Davis et al. |
| 6,321,338 B1 | | 11/2001 | Porras et al. |
| 6,330,546 B1 | | 12/2001 | Gopinathan et al. |
| 6,484,182 B1 | | 11/2002 | Dunphy et al. |
| 6,530,024 B1 | | 3/2003 | Proctor |
| 6,590,580 B2 | | 7/2003 | Horikawa et al. |
| 6,611,863 B1 | | 8/2003 | Banginwar |
| 6,681,249 B2 | | 1/2004 | Christensen et al. |
| 6,744,780 B1 | | 6/2004 | Gu et al. |
| 6,961,858 B2 | | 11/2005 | Fransdonk |
| 6,965,294 B1 | | 11/2005 | Elliot et al. |
| 7,020,635 B2 | | 3/2006 | Hamilton et al. |
| 7,058,968 B2 | | 6/2006 | Rowland et al. |
| 7,080,049 B2 | | 7/2006 | Truitt et al. |
| 7,090,128 B2 | | 8/2006 | Farley et al. |
| 7,095,850 B1 | | 8/2006 | McGrew |
| 7,107,462 B2 | | 9/2006 | Fransdonk |
| 7,150,045 B2 | | 12/2006 | Koelle et al. |
| 7,152,242 B2 | | 12/2006 | Douglas |
| 7,174,462 B2* | | 2/2007 | Pering .................... G06F 21/36 713/168 |
| 7,260,844 B1 | | 8/2007 | Tidwell et al. |
| 7,305,709 B1 | | 12/2007 | Lymer et al. |
| 7,565,693 B2 | | 7/2009 | Shin et al. |
| 7,587,502 B2 | | 9/2009 | Crawford et al. |
| 7,620,606 B2 | | 11/2009 | Gentry et al. |
| 7,660,795 B2 | | 2/2010 | Barrett et al. |
| 7,685,254 B2 | | 3/2010 | Pandya |
| 7,711,586 B2 | | 5/2010 | Aggarwal et al. |
| 7,835,721 B2 | | 11/2010 | Tuulos et al. |
| 7,895,649 B1 | | 2/2011 | Brook et al. |
| 7,921,205 B2 | | 4/2011 | Shen et al. |
| 7,937,353 B2 | | 5/2011 | Bernoth et al. |
| 8,001,054 B1 | | 8/2011 | Peart et al. |
| 8,074,282 B1 | | 12/2011 | Lymer et al. |
| 8,087,085 B2 | | 12/2011 | Hu et al. |
| 8,117,458 B2* | | 2/2012 | Osborn, III ............. G06F 21/36 713/183 |
| 8,146,160 B2 | | 3/2012 | Orr et al. |
| 8,272,061 B1 | | 9/2012 | Lotem et al. |
| 8,406,119 B2 | | 3/2013 | Taylor et al. |
| 8,621,636 B2 | | 12/2013 | Bailey |
| 8,639,629 B1 | | 1/2014 | Hoffman |
| 8,650,129 B2 | | 2/2014 | Bailey |
| 8,752,142 B2 | | 6/2014 | Bailey |
| 8,850,539 B2 | | 9/2014 | Bailey |
| 8,924,296 B2 | | 12/2014 | Bailey |
| 8,955,140 B2 | | 2/2015 | Bailey |
| 8,959,568 B2 | | 2/2015 | Hudis et al. |
| 9,027,120 B1 | | 5/2015 | Tidwell et al. |
| 9,213,975 B2 | | 12/2015 | Bailey |
| 9,292,695 B1 | | 3/2016 | Bassett |
| 2002/0129145 A1 | | 9/2002 | Chow |
| 2002/0194096 A1 | | 12/2002 | Falcone et al. |
| 2002/0194119 A1 | | 12/2002 | Wright et al. |
| 2003/0076959 A1 | | 4/2003 | Chui |
| 2003/0110392 A1 | | 6/2003 | Aucsmith et al. |
| 2003/0145226 A1 | | 7/2003 | Bruton, III et al. |
| 2003/0223584 A1 | | 12/2003 | Bradley et al. |
| 2004/0015719 A1 | | 1/2004 | Lee et al. |
| 2004/0030927 A1 | | 2/2004 | Zuk |
| 2004/0049698 A1 | | 3/2004 | Ott et al. |
| 2004/0187034 A1 | | 9/2004 | Tamura et al. |
| 2005/0010768 A1 | | 1/2005 | Light et al. |
| 2005/0091527 A1 | | 4/2005 | Swander et al. |
| 2005/0125360 A1 | | 6/2005 | Tidwell et al. |
| 2005/0164675 A1 | | 7/2005 | Tuulos et al. |
| 2005/0182969 A1 | | 8/2005 | Ginter et al. |
| 2005/0201561 A1 | | 9/2005 | Komano et al. |
| 2006/0085839 A1 | | 4/2006 | Brandt et al. |
| 2006/0090198 A1 | | 4/2006 | Aaron |
| 2006/0161435 A1 | | 7/2006 | Atef et al. |
| 2006/0200427 A1 | | 9/2006 | Morrison et al. |
| 2006/0200666 A1 | | 9/2006 | Bailey, Jr. |
| 2006/0225132 A1 | | 10/2006 | Swift et al. |
| 2006/0265739 A1 | | 11/2006 | Bhaskaran et al. |
| 2006/0276173 A1 | | 12/2006 | Srey et al. |
| 2006/0291447 A1 | | 12/2006 | Siliquini et al. |
| 2007/0016955 A1 | | 1/2007 | Goldberg et al. |
| 2007/0036314 A1 | | 2/2007 | Kloberdans et al. |
| 2007/0101432 A1 | | 5/2007 | Carpenter |
| 2007/0143832 A1 | | 6/2007 | Perrella et al. |
| 2007/0234412 A1 | | 10/2007 | Smith et al. |
| 2007/0250709 A1 | | 10/2007 | Bailey, Jr. |
| 2008/0082380 A1 | | 4/2008 | Stephenson |
| 2008/0086759 A1 | | 4/2008 | Colson |
| 2008/0098464 A1 | | 4/2008 | Mizrah |
| 2008/0104700 A1 | | 5/2008 | Fagone et al. |
| 2008/0120707 A1 | | 5/2008 | Ramia |
| 2008/0178294 A1 | | 7/2008 | Hu |
| 2008/0243439 A1 | | 10/2008 | Runkle |
| 2008/0262990 A1 | | 10/2008 | Kapoor et al. |
| 2008/0270579 A1 | | 10/2008 | Herz et al. |
| 2008/0307487 A1 | | 12/2008 | Choyi et al. |
| 2009/0025084 A1 | | 1/2009 | Siourthas et al. |
| 2009/0044279 A1 | | 2/2009 | Crawford et al. |
| 2009/0112767 A1 | | 4/2009 | Hammad |
| 2009/0125977 A1 | | 5/2009 | Chander et al. |
| 2009/0158425 A1 | | 6/2009 | Chan et al. |
| 2009/0165125 A1 | | 6/2009 | Brown et al. |
| 2009/0216910 A1 | | 8/2009 | Duchesneau |
| 2009/0222907 A1 | | 9/2009 | Guichard |
| 2009/0271844 A1 | | 10/2009 | Zhang et al. |
| 2009/0292568 A1 | | 11/2009 | Khosravani et al. |
| 2009/0300716 A1 | | 12/2009 | Ahn |
| 2009/0328219 A1 | | 12/2009 | Narayanaswamy |
| 2010/0010874 A1 | | 1/2010 | Howard et al. |
| 2010/0082513 A1 | | 4/2010 | Liu |
| 2010/0094767 A1 | | 4/2010 | Miltonberger |
| 2010/0251388 A1 | | 9/2010 | Dorfman |
| 2010/0275010 A1 | | 10/2010 | Ghirardi |
| 2010/0280950 A1 | | 11/2010 | Faith |

(56) References Cited

U.S. PATENT DOCUMENTS

| | | |
|---|---|---|
| 2010/0293090 A1 | 11/2010 | Domenickos et al. |
| 2010/0294927 A1 | 11/2010 | Nelson et al. |
| 2011/0016513 A1 | 1/2011 | Bailey, Jr. |
| 2011/0154034 A1 | 6/2011 | Bailey, Jr. |
| 2011/0154497 A1 | 6/2011 | Bailey, Jr. |
| 2011/0178933 A1 | 7/2011 | Bailey, Jr. |
| 2011/0252479 A1 | 10/2011 | Beresnevichiene et al. |
| 2011/0313925 A1 | 12/2011 | Bailey, Jr. |
| 2011/0313930 A1 | 12/2011 | Bailey, Jr. |
| 2011/0314529 A1 | 12/2011 | Bailey, Jr. |
| 2014/0156515 A1 | 6/2014 | Bailey |
| 2014/0379581 A1 | 12/2014 | Bailey |
| 2015/0012979 A1 | 1/2015 | Bailey |
| 2015/0161611 A1 | 6/2015 | Duke |

FOREIGN PATENT DOCUMENTS

| | | |
|---|---|---|
| CN | 101300566 | 11/2008 |
| CN | 101438251 | 5/2009 |
| GB | 2456742 | 7/2009 |
| JP | 2004-078539 A | 3/2004 |
| JP | 2004280724 | 10/2004 |
| JP | 2009-110334 A | 5/2009 |
| JP | 2009523275 | 6/2009 |
| JP | 2011517859 | 6/2011 |
| WO | 2009-021070 A1 | 2/2009 |

OTHER PUBLICATIONS

Zhigun Chen, "Java Card Technology for Smart Cards: Architecture and Programmers Guide", Prentice Hall (2000), pp. 57-63.
Clayton M. Christensen and Michael E. Raynor, "The Innovators Solution: Creating and Sustaining Successful Growth" Harvard Business Press (2003), pp. 31-71.
Edward T. Dowling, "Mathematical Methods for Business and Economics", McGraw-Hill (2009), pp. 89-127 and 177-196.
Robert Gibbons, "Game Theory for Applied Economists", Princeton University Press (1992), pp. 29-48 and 173-255.
Charles W. L. Hill and Gareth R. Jones, "Strategic Management Theory: An Integrated Approach", South-Western College Pub, 9th edition (2009), pp. 208-241.
Michael Howard and David Leblanc, "Writing Secure Code, Practical Strategies and Techniques for Secure Application Coding in a Networked World", Microsoft Press, 2nd ed. (2003), pp. 69-124, 259-298, and 455-476.
Ronald L. Krutz and Russell Dean Vines, "The CISSP Prep Guide, Mastering the Ten Domains of Computer Security", Wiley (2001), pp. 183-213.
Peter Morris, "Introduction to Game Theory", Springer Verlag New York, Inc. (1994), pp. 65-97.
Winn Schwartau, "Time Based Security", Interpact Press (1999), pp. 33-36, 65-74, and 121-125.
Shreeraj Shah, "Hacking Web Services", Charles River Media (2006), pp. 171-221, 271-298.
Fred B. Wrixon, "Codes Ciphers & Other Cryptic and Clandestine Communications, Making and Breaking Secret Messages from Hieroglyphs to the Internet", Black DogLrvrnthal Pub. (1998), pp. 298-309.
Colin English et al., "Dynamic Trust Models for Ubiquitous Computing Environments", University of Strathclyde, Glasgow, Scotland, Department of Computer and Information Sciences (2002).
Graham Messick, "Cyber War: Sabotaging the System" (Nov. 8, 2009), CBS Interactive Inc., http://www.cbsnews.com/stories/2009/11/06/60minutes/min5555565.
shtml?tag=currentVideoInfo;segmentUtilities.
Peng Ning and Sushil Jajodia, "Intrusion Detection Techniques", http://discovery.csc.ncsu.edu/Courses/csc774-S03/IDTechniques.pdf (last visited Sep. 24, 2010).
Brian Wotring, "Host Integrity Monitoring: Best Practices for Deployment" (Mar. 31, 2004), http://www.symantec.com/connect/articles/host-integrity-monitoring-best-practices-deployment.

International Search Report and Written Opinion dated Feb. 2, 2011 in Application No. PCT/US2010/059883.
International Search Report and Written Opinion dated Feb. 2, 2011 in Application No. PCT/US2010/059887.
International Search Report and Written Opinion dated Feb. 11, 2011 in Application No. PCT/US2010/059889.
Office Action dated Aug. 5, 2011 in U.S. Appl. No. 12/820,190.
Office Action dated Aug. 5, 2011 in U.S. Appl. No. 12/640,289.
International Search Report and Written Opinion dated Nov. 14, 2011 in Application No. PCT/US2011/041147.
Office Action dated Dec. 9, 2011 in U.S. Appl. No. 12/820,186.
International Preliminary Report on Patentability dated Jan. 17, 2012 in Application No. PCT/US2010/042043.
Final Office Action dated Jan. 19, 2012 in U.S. Appl. No. 12/640,289.
Office Action dated Jan. 20, 2012 in U.S. Appl. No. 12/504,828.
Final Office Action dated Feb. 10, 2012 in U.S. Appl. No. 12/820,190.
Final Office Action dated Mar. 29, 2012 in U.S. Appl. No. 12/820,186.
Office Action dated Mar. 30, 2012 in U.S. Appl. No. 12/640,183.
Advisory Action dated May 9, 2012 in U.S. Appl. No. 12/640,289.
Advisory Acton dated Jun. 6, 2012 in U.S. Appl. No. 12/820,190.
International Preliminary Report on Patentability dated Jun. 19, 2012 in Application No. PCT/US2010/059887.
International Preliminary Report on Patentability dated Jun. 19, 2012 in Application No. PCT/US2010/059883.
Office Action dated Jun. 25, 2012 in U.S. Appl. No. 12/640,289.
Final Office Action dated Jul. 2, 2012 in U.S. Appl. No. 12/504,828.
Advisory Action dated Jul. 10, 2012 in U.S. Appl. No. 12/820,186.
Office Action dated Jul. 18, 2012 in U.S. Appl. No. 12/820,190.
International Preliminary Report on Patentability dated Jul. 24, 2012 in Application No. PCT/US2010/059889.
Office Action dated Aug. 28, 2012 in U.S. Appl. No. 12/820,186.
Office Action dated Sep. 4, 2012 in U.S. Appl. No. 12/690,461.
Office Action dated Sep. 4, 2012 in U.S. Appl. No. 12/820,193.
Final Office Action dated Oct. 11, 2012 in U.S. Appl. No. 12/640,183.
Advisory Action dated Oct. 11, 2012 in U.S. Appl. No. 12/504,828.
Final Office Action dated Dec. 19, 2012 in U.S. Appl. No. 12/820,186.
Notice of Allowance dated Dec. 26, 2012 in U.S. Appl. No. 12/690,461.
International Preliminary Report on Patentability dated Dec. 28, 2012 in Application No. PCT/US2011/041147.
Advisory Action dated Jan. 16, 2013 in U.S. Appl. No. 12/640,183.
Final Office Action dated Mar. 5, 2013 in U.S. Appl. No. 12/820,193.
Office Action dated Mar. 28, 2013 in U.S. Appl. No. 12/640,183.
Advisory Action dated May 29, 2013 in U.S. Appl. No. 12/820,193.
Office Action dated Jun. 24, 2013 in U.S. Appl. No. 12/504,828.
Office Action dated Jul. 15, 2013 in U.S. Appl. No. 12/820,193.
Notice of Allowance dated Aug. 21, 2013 in U.S. Appl. No. 12/640,183.
Office Action received Sep. 5, 2013 in Mexican Application No. MX/A/2012/000606.
Final Office Action dated Sep. 30, 2013 in U.S. Appl. No. 12/640,289.
Office Action dated Oct. 2, 2013 in U.S. Appl. No. 12/820,186.
Notice of Allowance dated Oct. 7, 2013 in U.S. Appl. No. 12/690,461.
Final Office Action dated Oct. 23, 2013 in U.S. Appl. No. 12/820,190.
Notice of Allowance dated Dec. 2, 2013 in U.S. Appl. No. 12/504,828.
Office Action dated Jan. 24, 2014 in Japanese Application No. 2012-520759.
Office Action received Jan. 27, 2014 in Mexican Application No. MX/A/2012/000606.
Final Office Action dated Jan. 28, 2014 in U.S. Appl. No. 12/820,193.
Office Action dated Mar. 3, 2014 in Chinese Application No. 201080029478.7.

(56) References Cited

OTHER PUBLICATIONS

Notice of Allowance dated May 5, 2014 in U.S. Appl. No. 12/820,186.
Corrected Notice of Allowability dated May 8, 2014 in U.S. Appl. No. 12/504,828.
Notice of Allowance dated May 22, 2014 in U.S. Appl. No. 12/820,193.
Office Action dated Oct. 7, 2014 in U.S. Appl. No. 14/139,840.
International Search Report and Written Opinion dated Nov. 15, 2010 in Application No. PCT/US2010/042043.
Office Action dated Feb. 28, 2013 in Mexican Application No. MX/A/2012/000606.
Office Action dated Apr. 29, 2015 in U.S. Appl. No. 14/492,771.
Office Action dated Jun. 4, 2015 in Canadian Application No. 2,767,862.
Office Action dated Jun. 16, 2016 in U.S. Appl. No. 14/175,475.
Notice of Allowance dated Aug. 12, 2015 in U.S. Appl. No. 14/492,771.
Office Action dated Nov. 2, 2015 in U.S. Appl. No. 14/252,276.
Office Action dated Jun. 15, 2016 in U.S. Appl. No. 14/599,151.
Office Action dated Feb. 22, 2016 in U.S. Appl. No. 12/640,289.
Notice of Allowance dated Feb. 24, 2016 in U.S. Appl. No. 14/252,276.
Office Action dated Apr. 7, 2016 in U.S. Appl. No. 12/820,190.
Notice of Allowance dated May 27, 2016 in Canadian Application No. 2,767,862.
Office Action dated Jan. 9, 2015 in U.S. Appl. No. 14/480,169.
Final Office Action dated Apr. 23, 2015 in U.S. Appl. No. 14/480,169.
Advisory Action dated Aug. 5, 2015 in U.S. Appl. No. 14/480,169.
Office Action dated Feb. 1, 2016 in U.S. Appl. No. 14/480,169.
Final Office Action dated Jul. 14, 2016 in U.S. Appl. No. 12/640,289.
Extended European Search Report dated Jul. 22, 2016 in European Application No. 10800510.9.
Advisory Action dated Sep. 23, 2016 in U.S. Appl. No. 12/640,289.
Final Office Action dated Sep. 29, 2016 in U.S. Appl. No. 14/599,151.
Notice of Allowance dated Oct. 13, 2016 in U.S. Appl. No. 14/175,475.
Final Office Action dated Nov. 3, 2016 in U.S. Appl. No. 12/820,190.
U.S. Appl. No. 15/337,246 filed Oct. 28, 2016 entitled "Selectable Encryption Methods".
Office Action dated Nov. 14, 2016 in U.S. Appl. No. 12/640,289.
Advisory Action dated Dec. 27, 2016 in U.S. Appl. No. 14/599,151.
Advisory Action dated Jan. 11, 2017 in U.S. Appl. No. 12/820,190.
Office Action dated Jan. 17, 2017 in U.S. Appl. No. 14/599,151.
Notice of Allowance dated Feb. 23, 2017 in U.S. Appl. No. 15/166,673.
Bailey, U.S. Appl. No. 15/456,252, filed Mar. 10, 2017 and entitled Security Safeguard Modification.
Final Office Action dated Mar. 20, 2017 in U.S. Appl. No. 14/480,169.
Final Office Action dated Mar. 29, 2017 in U.S. Appl. No. 12/640,289.
Notice of Allowance dated May 9, 2017 in U.S. Appl. No. 14/599,151.
Advisory Action dated Jun. 12, 2017 in U.S. Appl. No. 14/480,169.
U.S. Appl. No. 15/629,492, filed Jun. 21, 2017 entitled "Mobile Device Sensor Data".
Notice of Allowance dated Jun. 28, 2017 in U.S. Appl. No. 12/640,289.
Paquet, "Network Security Concepts and Policies," Sample chaper is provided courtes of Cisco Press, Feb. 5, 2013, 29 pages, http://ciscopress.com/articles/article/asp?p=1998559, retrieved online Jun. 17, 2017.
Office Action dated Jun. 1, 2017 in Chinese Application No. 201510029327.6.

\* cited by examiner

| UNDERLYING CHARACTER | IMAGE (OR OTHER ITEM) | CODE |
|---|---|---|
| UNDERLYING CHARACTER 2 402a | IMAGE 4 403a | CODE 1 404a |
| UNDERLYING CHARACTER 3 402b | IMAGE 1 403b | CODE 2 404b |
| UNDERLYING CHARACTER 4 402c | IMAGE 3 403c | CODE 3 404c |
| UNDERLYING CHARACTER 1 402d | IMAGE 2 403d | CODE 4 404d |

ADAPTIVE POLICIES AND PROTECTIONS FOR SECURING FINANCIAL TRANSACTION DATA AT REST

CROSS-REFERENCE TO RELATED APPLICATION

This application is a continuation of U.S. patent application Ser. No. 14/492,771, filed Sep. 22, 2014. U.S. patent application Ser. No. 14/492,771 is a continuation of U.S. patent application Ser. No. 12/820,193, filed on Jun. 22, 2010, now U.S. Pat. No. 8,850,539. The entire disclosure of the forgoing applications is hereby incorporated by reference herein.

BACKGROUND OF THE INVENTION

Field of the Invention

The present invention generally relates to information security systems, and more particularly, to adaptive policies and protections for securing financial transaction data at rest.

Related Art

With the proliferation of mobile communication devices, such as mobile telephones, financial account holders that have such devices have begun to use them to complete financial transactions. Enabling financial account holders to do so, however, poses unique security risks for financial account issuers, particularly because security capabilities and risks vary widely across different mobile communication devices and different mobile communication networks. For example, typical payment systems involve point-of-sale (POS) terminals that are usually owned and designed by either financial transaction issuers or merchants. In contrast, because mobile communication devices are manufactured by various manufacturers and can be modified by third parties, financial account issuers have less control and knowledge of the security capabilities and risks associated with them. This makes it more difficult to control the security of financial transactions that are completed using mobile communication devices. Security measures vary based on particular models of mobile communication devices, thus compounding this inherent security risk.

The risk for financial account issuers is further complicated by the mobility of mobile communication devices. Each location in which mobile communication devices can be operated potentially has a different security environment. As a result, different security measures for each location are necessary. For example, bringing a mobile communication device into a foreign or visiting country may require the mobile communication device to roam on a foreign or visiting mobile communication network, which has inherently different security countermeasures, attack scenarios, risks, capabilities, and other characteristics.

Security designers perform a labor-intensive and exhaustive analysis of the risks associated with each component of a new network in an attempt to safely interface their existing security system with the new network. The existing security system is often modified to accommodate the risks associated with the new network. This process takes a substantial amount of time and thus limits the speed with which financial account issuers can enter new markets that utilize mobile-based financial transaction networks. As a consequence, they can lose market share.

In addition, security designers typically assume that all security characteristics and risks of the network components will remain static, or remain within a tolerance related to nominal protection, once the system is deployed. A typical security system thus utilizes a particular set of security measures deployed until the security system is taken offline and either replaced or modified. In other words, if risks of the security system change, for example, due to an innovation, a new service, discovery of a design or product flaw, breach of a security measure by an attacker, etc., a maintenance window or an outage must be realized to enable the security system to be modified to respond to a security breach, patch, or upgrade. Such a system cannot adapt dynamically to various detected feedback relating to changes impacting the security situation of the network. Typical security systems, therefore, lack the adaptability necessary to be suitable for mobile-based financial transaction systems that must constantly innovate to adapt to changing markets, services, and business models. Moreover, the static security measures of typical fortress security systems increase the ease with which internal and external attackers can circumvent less adaptive security measures. As payment and network systems adapt to next generation payment and communication, the attacks and exploits will also evolve into next generation criminal exploits. As higher communication speeds, multiple communication channels, and multiple communication protocols become more common for convergent services, attack scenarios and protection mechanisms will be represented by matrices as opposed to the linear singularity used in traditional systems to represent exposure.

Notwithstanding the above-mentioned security risks, enabling mobile transactions is still a particularly attractive means for financial account issuers to enter the markets of non-bankable countries where widespread POS infrastructure is neither available nor practical.

Given the foregoing, it would be useful to be able to continuously detect changes in network security characteristics, and adapt based on these detected changes to maintain an acceptable level of security for existing and new network connections including merchants, customers, and partners for visiting and home networks.

It also would be useful to enable business entities, such as financial account issuers, to enter new markets (e.g., the mobile-based financial transaction market) with minimal modifications to their existing security system, and to accept new risk scenarios with the ability to manage magnitude of exposure by network segment, region, issuer, partner, device, and/or account across numerous device and network types.

In addition, it would be useful to enable the characterization of currently uncharacterized (e.g., non-domestic) communication network components and/or attributes to enable adaptation to the risks to maintain an acceptable level of security.

BRIEF DESCRIPTION OF THE INVENTION

The present invention meets the above-identified needs by providing systems, methods, and computer program products for implementing adaptive policies and protections to secure financial transaction data at rest.

Trust mediator agents, which are associated with each network component, continuously detect changes or signatures in the security characteristics of each network component using sensors and feed the detected changes or signatures back to a trust mediator. The trust mediator uses the feedback from the trust mediator agents to determine whether and how to modify currently running security safeguards in order to maintain an appropriate level of security that considers the interdependency of each component and asset at risk. Modifications, if any, are communicated by the trust mediator to the appropriate network component via its associated trust mediator agent for implementation. The process is recursive and thus continuously adapts to changes in network security characteristics as they arise over time to strike a balance between the probability of loss and magnitude of loss versus acceptable risk to enable business transactions to continue without disruption at an account level and/or at a network component level.

A business entity (e.g., a financial account issuer) can integrate new communication networks having new security characteristics into their existing network without the need to perform an exhaustive and labor-intensive upfront analysis to estimate the security impact a new communication network will have on their existing network. Instead, the business entity can define rules, such as a threshold of acceptable risk, begin to communicate with the new network, and enable their existing security system to detect and adapt to the security characteristics of the new network while maintaining the acceptable risk acceptance level. Managing system interdependency relating to security signature state assists in evaluating changes related to new exploits, products, services, or innovations to reduce time-to-market while managing the acceptable level of risk exposed to the business within nominal levels to maintain brand and financial equity.

Users' expectations regarding security measures are taken into account. Thus, if a particular security measure is too inconvenient for a user, the security measure is modified or reduced to a minimal level within limits that do not degrade nominal protection for the system. This balances the risk acceptance of a firm with a convenience cost representing user or account holder countermeasure choice, and provides the issuer and the account holder with firm acceptable transaction risk elasticity. Alternatively, if the security measure provides too low a security level for the user to accept the security measure, it is modified or replaced with a more rigorous security measure with an alternate method. The effect is to increase the propensity for user satisfaction and thus movement towards equilibrium of strategy and payoff for usage of the system based on time, location, and relevance, and results in more efficient risk models to increase market share for the business entity. Users are offered choices to increase their propensity of adoption and use of security methods, while mitigating the circumnavigation of security controls that puts merchants, financers, and financees at risk.

In one embodiment, a system for challenge-response authentication is provided by receiving, from an external terminal over a communication network, a request for access to a service. A plurality of objects is presented to a user via a display. A plurality of codes is received over the communication network, each of the plurality of codes corresponding to one of the plurality of objects. The plurality of codes are matched to a plurality of alphanumeric characters according to a predetermined table. An alphanumeric string is generated from the plurality of alphanumeric characters and the alphanumeric string is compared to a user identifier stored in a database. Based on the comparing, a determination is made as to whether to grant the user access to the service.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the following drawings.

DETAILED DESCRIPTION

I. Overview

Figure 1:
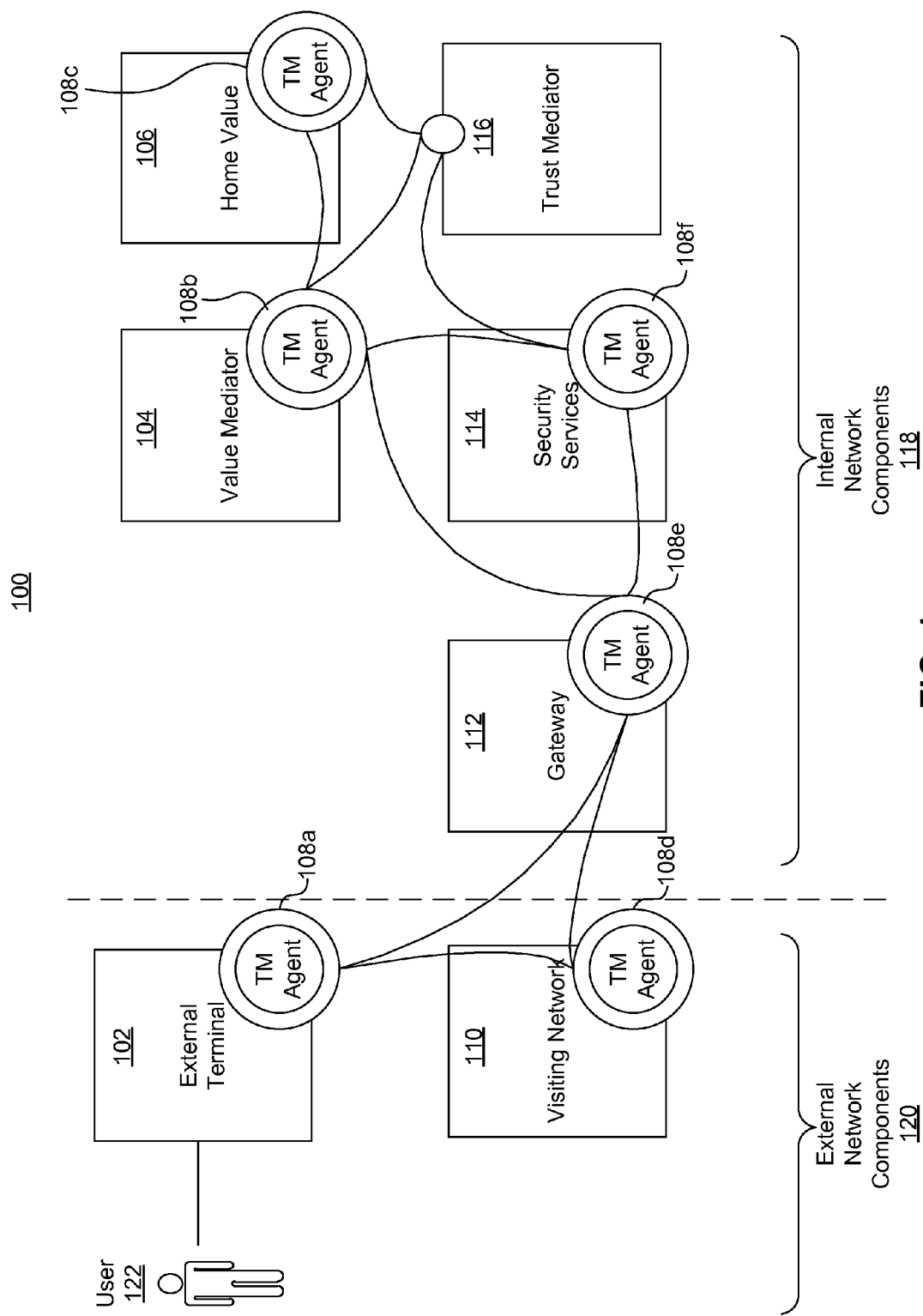
FIG. 1 is a diagram of an exemplary security system for adaptively securing mobile communication device transactions in accordance with an embodiment of the present invention.

The present invention is directed to a system for implementing adaptive policies and protections to secure financial transaction data at rest, which is now described in more detail herein in terms of an example mobile financial payment system. This is for convenience only and is not intended to limit the application of the present invention. In fact, after reading the following description, it will be apparent to one skilled in the relevant art(s) how to implement the following invention in alternative embodiments (e.g., general network security systems, mass transit security systems, homeland security systems, home and business security systems, etc.).

The terms "user," "consumer," "account holder," and/or the plural form of these terms are used interchangeably throughout herein to refer to those persons or entities capable of accessing, using, being affected by and/or benefiting from the present invention.

A "merchant" as used herein refers to any person, entity, distributor system, software and/or hardware that is a provider, broker and/or any other entity in the distribution chain of goods or services. For example, a merchant can be a grocery store, a retail store, a travel agency, a service provider, an online merchant or the like.

A "transaction account" as used herein refers to an account associated with an open account or a closed account system. The transaction account can exist in a physical or non-physical embodiment. For example, a transaction account can be distributed in non-physical embodiments such as an account number, frequent-flyer account, telephone calling account or the like. Furthermore, a physical embodiment of a transaction account can be distributed as a financial instrument.

An "account," "account number," or "account code," as used herein, can include any device, code, number, letter, symbol, digital certificate, smart chip, digital signal, analog signal, biometric or other identifier/indicia suitably configured to allow a consumer to access, interact with or communicate with a financial transaction system. The account number can optionally be located on or associated with any financial transaction instrument (e.g., a rewards, charge, credit, debit, prepaid, telephone, embossed, smart, magnetic stripe, bar code, transponder or radio frequency card).

The terms "financial account issuer," "account issuer," and "issuer," and/or the plural forms of these terms are used interchangeably throughout herein to refer to those persons or entities that provide transaction account(s) to account holders. For example, an issuer may be a credit card issuer, a bank, or any other financial institution.

In general, transaction accounts can be used for transactions between the user and merchant through any suitable online or offline communication network, such as, for example, a wired network, a wireless network, a telephone network, an intranet, the global, public Internet, and/or the like. Additionally, the user can complete transactions with the merchant using any suitable communication device, such as a point-of-interaction device (e.g., a point-of-sale (POS) device, a personal digital assistant (PDA), a mobile telephone, a kiosk, resource access, area access, entitlement access, etc.), a radio frequency enabled transaction card, and/or the like.

A financial transaction instrument (also referred to as a "payment device") can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument can also have electronic functionality provided by a network of electronic circuitry that is printed or otherwise incorporated onto or within the transaction instrument (and typically referred to as a "smart card"), or be a fob having a transponder and an RFID reader.

The term "safeguard," "security measure," "security safeguard," "protection method," "protection mechanism," and/or the plural forms of these terms are used interchangeably throughout herein to refer to any process, hardware, software, algorithm, countermeasure, or the like, that increases security, confidentiality, and/or integrity of data communicated over communication networks. For example, a safeguard can be a key length, an encryption/decryption algorithm, a checksum, a hash function, an access level, a password requirement, a fingerprint requirement, or the like. Protection mechanism(s) may be one-dimensional, i.e., composed of a single protection mechanisms, or multi-dimensional, composed of multiple protection mechanisms.

The term "security-related information" is used herein to refer to any data or information that can be used by a trust mediator (described below) as the basis for making decisions as to implementations of security policy. For example, security-related information can include data relating to threats, exploits, attacks, safeguards, security measures, security safeguards, protection mechanisms, financial transaction-related data, non-financial-transaction-related data, mobile phone usage data, magnitude data, loss expectancy data, and the like.

The terms "transaction" and "financial transaction," and/or the plural forms of these terms, are used interchangeably throughout herein to refer to any transfer of value between two or more parties and/or communication network endpoints.

The terms "mobile transaction" and "mobile financial transaction," and/or the plural forms of these terms, are used interchangeably throughout herein to refer to any transfer of value between two or more parties effectuated via communication network endpoints, with at least one of the communication network endpoints being a mobile communication device.

The terms "object" and/or "objects" are used interchangeably throughout herein to refer to an image, an audio recording, a video recording, and/or a tactile presentation used for challenge-response authentication.

II. System

FIG. 1 is a diagram of an exemplary security system 100 for adaptively securing mobile communication device transactions in accordance with an embodiment of the present invention. As shown in FIG. 1, security system 100 includes both internal network components 118 and external network components 120. Internal network components 118 are network components that are internal to an issuer network. External network components 120 are network components that are external to the issuer network.

External network components 120 include an external terminal 102, which is any electronic communication device a consumer can use as an interface to complete a financial transaction with a merchant. Examples of types of financial transactions a user 122 may request include a purchase at a point-of-sale (POS) device, a transfer of funds from an account of user 122 to that of another user, a mobile-to-mobile fund transfer, a transfer of funds between two accounts commonly owned by user 122, a request for data stored in one of internal network components 118 in association with an account of user 122, a request to modify data stored in one of internal network components 118 in association with an account of user 122, etc. For example, external terminal 102 can be a point-of-sale (POS) device, a kiosk, or a mobile communication device such as a mobile telephone, a personal computer, a POS device, a personal digital assistant (PDA), a portable computing device, a radio frequency enabled transaction card, or the like.

Another external network component 120 is a visiting network 110, which is any electronic communication network that is communicatively coupled to external terminal 102 and one or more internal network components 118. Example visiting networks 110 include a mobile telephone carrier network, an external payment network and/or service, a media network, a private network, a public network, a Bluetooth™ network, an automated clearing house (ACH) network, a peer-to-peer (P2P) network, or the like.

Internal network components 118 include a gateway 112, which is communicatively coupled to visiting network 110. External terminal 102 communicates with internal network components 118 through visiting network 110. Gateway 112 translates communication network protocols to enable proper communication between visiting network 110 and internal network components 118. Gateway 112 also includes any number of communication network modules depending on the characteristics of visiting network 110 and internal network components 118. For instance, gateway 112 can include a firewall, a network address resolution table, a proxy for address translation, a session border controller, etc. (all not shown).

Another internal network component 118 is a security services module 114. Security services module 114 is communicatively coupled to gateway 112, and performs security functions such as encryption, decryption, key management, and/or any other functions suitable for ensuring the security, confidentiality, and/or integrity of data communicated throughout system 100.

Another internal network component 118 is home value (or valuation) module 106, which includes a memory or other electronic storage device (not shown) that electronically stores information related to electronic assets owned by the issuer. For example, home value 106 can store data entries representing credit, deposits, loyalty points, reward points, media, and the like. Each data entry of home value 106 has a value-base and an associated quantitative and/or qualitative value that also are stored in the memory (not shown) and are used by trust mediator 116 in order to assess security risks associated with that particular data entry.

Internal network components 118 also include a value mediator 104, which valuates electronic assets owned by an entity other than the issuer. These assets have a value-base other than the value-bases stored in home value 106. Value mediator 104 thus computes a quantitative value, and/or normalizes a qualitative value, for these assets to exchange the value across different value-bases. In addition, trust mediator 116 uses this quantitative value to compute risk magnitudes associated with these assets. For example, if the value of the transaction or commerce was an asset calculated by value mediator 104, then this computed value is input to trust mediator 116 to react by changing one or more protections, countermeasures, or policies related to the asset if thresholds associated with acceptable risk exposure are exceeded, or if user methods do not achieve an equilibrium between each player in the system, including stakeholders and criminals.

Trust mediator (TM) agents 108a-108f (collectively 108) are deployed on external terminal 102, visiting network 110, gateway 112, security services module 114, value mediator 104, and home value module 106, respectively. TM agents 108 detect and assess security-related information collected from one or more sensors corresponding to each respective network component and communicate this information to trust mediator 116. The sensors measure a physical quantity, such as an electronic signal or other data, and convert it into a signal which can be read by an observer and/or by an instrument, such as one or more of the TM agents 108 or trust mediator 116. The sensors can receive quantitative input, for example, from machines, electronics, etc. Alternatively, or in addition, the sensors can receive qualitative input from a human that initiates a topic of concern, such that data collection and normalization can be utilized for finite measurements, good will and intuitive measurements, and observations, which can then be validated with other qualitative or quantitative input. Trust mediator 116, in turn, communicates instructions to one or more of the TM agents 108 to modify implementation of security safeguards. Trust mediator 116 also assesses information received from the TM agents 108 and determines whether and/or how to modify security safeguards according to security and/or trust mediation algorithms that can be singular or a summation of plural safeguards and countermeasures interchangeable based on security goals.

An exemplary external terminal 102, as well as exemplary processes for adapting security measures of a communication network based on dynamic feedback, collecting data from sensors, and reporting the data to a trust mediator are disclosed in U.S. patent application Ser. No. 12/640,183, entitled "Systems, Methods, and Computer Program Products for Collecting and Reporting Sensor Data in a Communication Network," filed Dec. 17, 2009, which is hereby incorporated by reference in its entirety.

III. Process

A. Overview

Figure 2:
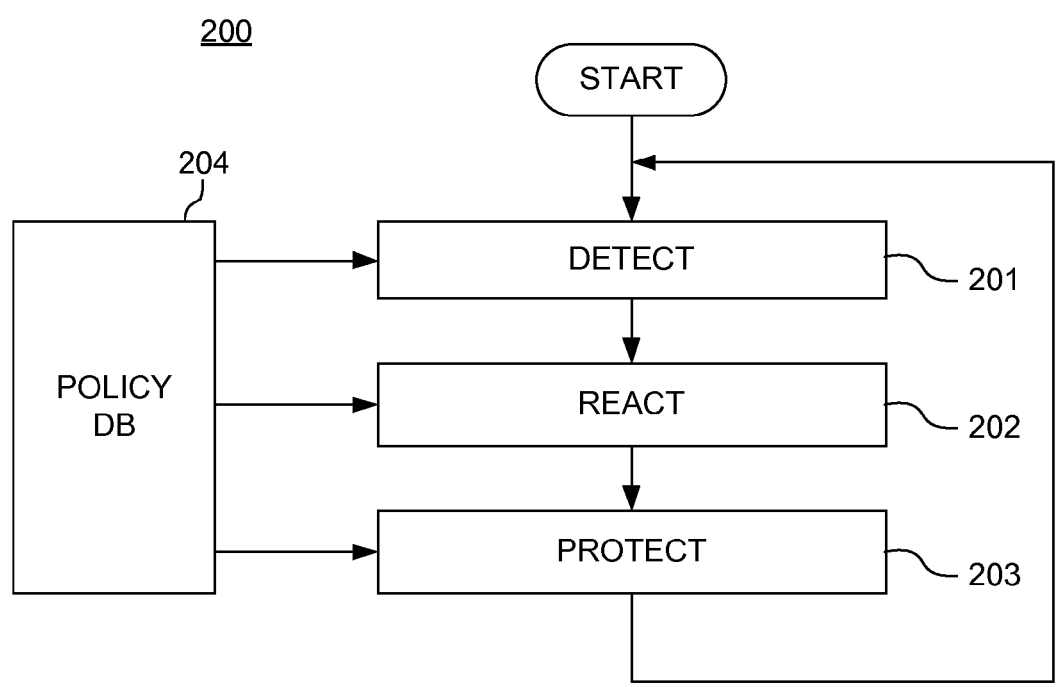
FIG. 2 is a flowchart illustrating an exemplary process for adaptively securing mobile communication device transactions in accordance with an embodiment of the present invention.

FIG. 2 is a flowchart illustrating an exemplary process 200 for adaptively securing mobile communication device transactions in accordance with an embodiment of the present invention. In general, trust mediator 116 detects security-related data from TM agents 108a-108f and value mediator 104, and reacts to the detected security-related data by configuring and/or adjusting security protection mechanisms according to a security policy stored in policy database 204. Security services module 114 communicates the configured security protection mechanisms to one or more of the network components in system 100 via the corresponding TM agents 108a-108f. The configured security protection mechanisms are implemented by security services module 114 in conjunction with the other network components of system 100.

1. Detection

The security policy stored in policy database 204 indicates which specific security-related data, i.e., which data variables, trust mediator 116 is to retrieve, as well as the corresponding times and retrieval techniques trust mediator 116 is to use to retrieve them. At block 201, trust mediator 116 retrieves and/or validates security-related data from TM agents 108a-108f according to the security policy stored in policy database 204.

Trust mediator 116 aggregates security-related data across numerous users 122, external terminals 102, TM agents 108a-108f, and other network components of system 100. Trust mediator 116 thus has a big picture of the security threats presented to numerous external terminals 102, enabling trust mediator 116 to react to security threats on a global scale.

By aggregating security-related data across numerous network components of system 100, trust mediator 116 detects wide-spread coordinated attacks, such as attacks randomly distributed across devices globally, which an external terminal 102 may be unable to detect on its own, absent knowledge of system-wide security-related data, threats, etc. Trust mediator 116 compares the aggregated security-related data to predetermined patterns of data stored in policy database 204 to detect attack signatures or patterns, and react accordingly to reduce the risk exposure of the increased sophistication and/or frequency of attacks.

Exemplary processes for collecting data from sensors and reporting the data to a trust mediator are disclosed in U.S. patent application Ser. No. 12/640,183, entitled "Systems, Methods, and Computer Program Products for Collecting and Reporting Sensor Data in a Communication Network," filed Dec. 17, 2009, which is hereby incorporated by reference in its entirety.

2. Reaction

The security policy stored in policy database 204 includes rules that dictate how trust mediator 116 responds to the detection of specific security-related data at block 201. At block 202, trust mediator 116 retrieves from policy database 204 the rules regarding the specific security protection mechanisms to be implemented in response to the security-related data retrieved at block 201. Security services module 114 implements the rules to determine which specific modifications to the security protection mechanisms to implement.

In some embodiments, the security policy includes rules that instruct trust mediator 116 to respond to the detection of specific security-related data by implementing security protection mechanisms including an encryption key, an encryption key length, an encryption provider, an encryption key lifecycle, a data storage location, a data storage format, and/or an authentication method for establishing trust for entitlements, etc.

In another embodiment, the security policy includes a rule that instructs trust mediator 116 to respond to the detection of specific security-related data by employing security services module 114 to dynamically vary security protection mechanisms according to predetermined criteria. Security services module 114 rotates numerous security protection mechanisms and values. For instance, security services module 114 alternates or rotates security protection mechanisms randomly, or according to a predetermined time period, or according to probabilities and/or statistics of previous transactions, etc. In this way, the security of system 100 is ever-changing, which makes it difficult for hackers to circumvent the security measures. The dynamic implementation of security protection mechanisms makes it difficult to misuse or hack external terminal 102 using malware that was installed prior to user 122 purchasing external terminal 102.

In yet another embodiment, the security policy includes a rule instructing trust mediator 116 to respond to the detection of specific security-related data by communicating an application update to external terminal 102 via TM agent 108a. Upon receipt of the application update from trust mediator 116, TM agent 108a installs the application update and communicates a confirmation of the installation to trust mediator 116.

In the event that external terminal 102 is unable to receive an application update, trust mediator 116 manages transactions and/or services for external terminal 102 at an acceptable risk level to avoid loss of service until the issue is resolved. For example, trust mediator 116 computes a predetermined risk threshold as being inversely proportional to a weighted average of the total number of external terminals 102 unable to receive necessary application updates. Trust mediator 116 retrieves from value mediator 104 a monetary value for each of the transactions and/or account services requested. Trust mediator 116 then computes risk levels for each of the transactions and/or account services requested by those external terminals 102 as weighted sum of a trust value of the respective external terminal 102 and a monetary value of the transaction and/or account service requested. Trust mediator 116 enables those external terminals 102 to complete transactions and/or access services so long as the corresponding risk levels for those transactions and/or services do not exceed the predetermined risk threshold. Trust mediator 116 thus holistically assesses and manages the risk exposure of system 100.

Exemplary processes for adapting security measures of a communication network based on dynamic feedback are disclosed in U.S. patent application Ser. No. 12/640,183, entitled "Systems, Methods, and Computer Program Products for Collecting and Reporting Sensor Data in a Communication Network," filed Dec. 17, 2009, which is hereby incorporated by reference in its entirety.

3. Protection

At block 203, trust mediator 116 and/or security services module 114 communicate the security protection mechanisms to external terminal 102 and the other network components of system 100 for implementation.

In one embodiment, the security protection mechanisms are communicated to the network components of system 100 in the form of a data packet including multiple fields, each corresponding to one aspect of a security protection mechanism. Each field has a corresponding flag indicating whether that particular aspect of the security protection mechanism is to be implemented. For example, if a flag has a value of a logical high (also sometimes referred to as a "1") then the corresponding security protection mechanism is to be implemented; and if the flag has a value of a logical low (also sometimes referred to as a "0") then the corresponding security protection mechanism is not to be implemented. Examples fields of the data packet include an encryption provider field, a field indicating a condition under which a particular encryption provider is to be used, a field instructing to rotate between multiple encryption providers, a field indicating whether to use a particular authentication method, etc.

Additional security protection mechanisms are discussed below in connection with FIGS. 3-5.

B. Challenge-Response Authentication

One example of a security protection mechanism utilizes an interactive graphical presentation for challenge-response authentication. In general, challenge-response authentication involves presenting a challenge to user 122 and authenticating user 122 only if user 122 presents a valid response to the challenge. User 122 is required to successfully complete this type of challenge-response authentication to be granted the ability to complete transactions and/or access account services using external terminal 102. This prevents unauthorized use of external terminal 102, for example, by a malicious user that neither owns nor is otherwise permitted to operate the external terminal 102. FIG. 3 is a flowchart illustrating an exemplary process 300 for generating an interactive graphical presentation for challenge-response authentication.

1. Generating Images

At block 301, security services module 114 generates one or more images to be used for challenge-response authentication, each image corresponding to an underlying alphanumeric character. Security services module 114 retrieves from a database (not shown) an identifier of user 122, such as a personal identification number (PIN), a password, etc. Security services module 114 then generates an image for each alphanumeric character of the identifier.

In general, each image can be generated as any discernible representation of its corresponding underlying alphanumeric character. For instance, an image can be generated as a direct image of its underlying alphanumeric character. Alternatively, the image can be generated as a distorted image of its underlying alphanumeric character so as to thwart unauthorized machine pattern recognition of the image. By using distorted images, security services module 114 thwarts root kits, botnets, and/or other malware that has been unlawfully installed on an external terminal in an effort to exploit external terminal 102.

If the underlying character is a number, the image can be generated as a corresponding number of sub-images, such as two apples for an underlying character of "2," three bananas for an underlying character of "3," etc.

In one embodiment, the images are pre-selected by user 122 to correspond to underlying alphanumeric characters. For example, user 122 selects an image including the text "number of children" to represent an underlying character of "3," which is the number of children of user 122.

In addition or as an alternative to images, another multimedia item, such as an audio recording, a video recording, a tactile presentation, or any other type of multimedia item, can be used for challenge-response authentication. For example, an audio recording of a popular song can be audibly reproduced by external terminal 102 as a challenge. External terminal 102 then requests that text corresponding to a name of the song be input into external terminal 102 as a response to the challenge for authentication. Alternatively a video clip showing a moving image of a code can be visibly reproduced by external terminal 102. External terminal 102 then requests that text corresponding to the code be input into external terminal 102 as a response to the challenge for authentication. In this way, fraudulently inputting the correct response to the challenge without being in possession of external terminal 102 is made more difficult.

In some embodiments, challenge-response authentication is achieved by using multiple types of multimedia items in combination, or by using randomly alternating multimedia types for each attempt to log onto system 100. By using combinations of and/or randomly distorted multimedia types for challenge-response authentication, the complexity of computations, data sampling, and/or eavesdropping are increased, thus making attacks on system 100 less feasible.

2. Generating Codes

At block 302, security services module 114 generates a code for each image generated at block 301. That is, each code has a corresponding image and a corresponding underlying alphanumeric character. As discussed below in further detail in connection with FIG. 5, user 122 uses external terminal 102 to transmit the code(s) generated at block 302 to security services module 114 as the response portion of the challenge-response authentication. The codes are transmitted as representing underlying alphanumeric characters, to minimize the likelihood that an unlawful recipient of the transmitted data learns of the underlying alphanumeric characters, and hence the identifier (e.g., PIN or password) of user 122.

In general, each code can be generated as any sequence of binary digits, so long as each code is unique with respect to the other codes of a given table. In one embodiment, each code is generated by a pseudorandom number generator. In another embodiment, each image has a code of a different length. Variation and randomness in the codes aids in preventing unauthorized recipients from being able to discern the underlying alphanumeric characters.

3. Generating a Table

At block 303, security services module 114 generates a table that matches the images, or other multimedia items, generated at block 301 to the corresponding codes generated at block 302. As discussed below in connection with FIG. 5, the table is used by security services module 114 to decode the codes received from external terminal 102 as the response to the authentication challenge. In general, there is a one-to-one match of images to codes such that each code has a corresponding image, and a corresponding underlying alphanumeric character. That is, the table is the link between the images, the codes, and the underlying alphanumeric characters.

In some embodiments, the tables are one-time use tables. That is, a table is generated each time a user 122 attempts to log onto system 100.

In another embodiment, the tables are used for a predetermined number of transaction requests and/or account service requests.

In still another embodiment, the tables are modified based on, for example, the detection of specific security-related data at block 201 (FIG. 2), or based on a pseudorandom number-based time interval, etc.

4. Generate a Challenge-Response Presentation

At block 304, security services module 114 generates a challenge-response presentation as an arrangement of the images generated at block 301.

In one embodiment, the images are randomly arranged, and to be authenticated user 122 must select each image, for example by clicking on each image, in an order such that the corresponding order of the underlying alphanumeric characters matches the identifier of user 122.

In one example embodiment, the images are randomly arranged, and to be authenticated user 122 must submit to security services module 114 an arrangement of the images having an order of the underlying alphanumeric characters that matches the identifier of user 122.

In an alternative example embodiment, the images are images of user's children, and to be authenticated user 122 must rearrange submit to security services module 114 an arrangement of the images such that the order of the images matches the chronological order of the births of the children.

In still another embodiment, the images are overlaid on top of one another, and to be authenticated user 122 pulls the images apart and submits to security services module 114 an arrangement of the images having an order of the underlying alphanumeric characters that matches the identifier of user 122.

Alternatively, where the goal is to prevent non-human (e.g., malware) access, a mathematical equation is presented to user 122, and to be authenticated user 122 is required to input the correct answer to the equation. For example, user 122 is presented with an image of the number two, an image of a plus sign, and an image of the number three. User is required to select an image containing the correct answer, which in this case is the number five.

As will be understood by those skilled in the art, other challenge-response presentations and corresponding user input methods are contemplated and are within the scope of the embodiments described herein.

Figure 4:
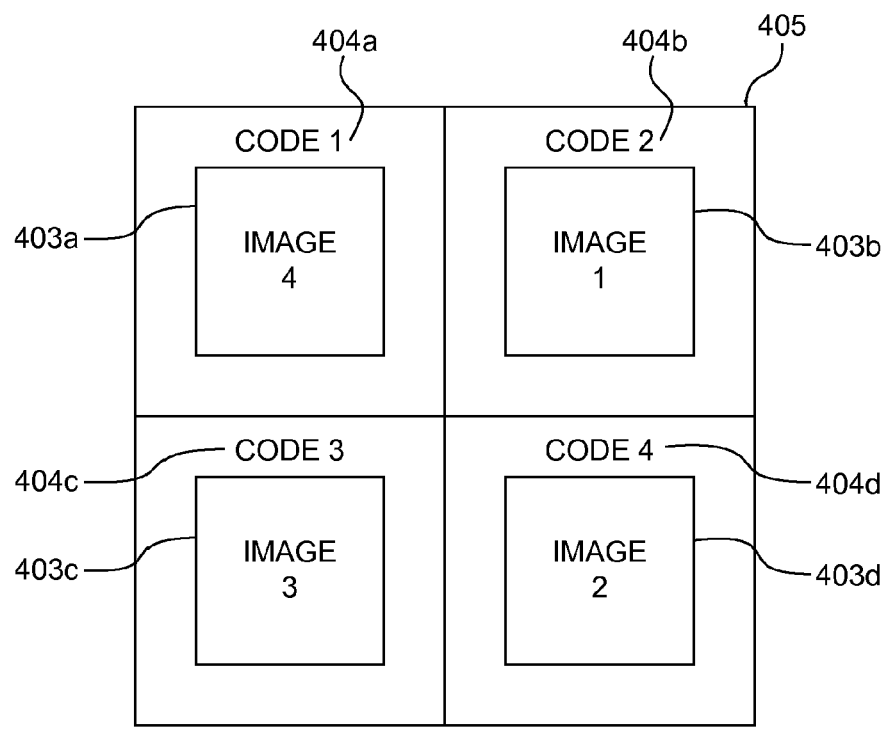
FIG. 4 depicts an exemplary table and presentation used for challenge-response authentication.

FIG. 4 depicts an exemplary table and presentation used for challenge-response authentication. As shown in FIG. 4, table 401 matches underlying characters 402a-402d, to images 403a-403d that were generated at block 301, and to codes 404a-404d that were generated at block 302, correspondingly.

As shown in FIG. 4, presentation 405 includes a 2×2 grid of images 403a-403d and codes 404a-404d. In another embodiment, presentation 405 includes a horizontal 1×4 arrangement of images 403a-403d. In still another embodiment, presentation 405 includes a spatial overlay of images 403a-403d. As will be understood by those skilled in the art, other presentations are contemplated (e.g., presentations using a different number of images or using other types of multimedia recordings such as audio and video recordings) and are within the scope of the embodiments described herein.

C. Implementing Challenge-Response Authentication

Figure 5:
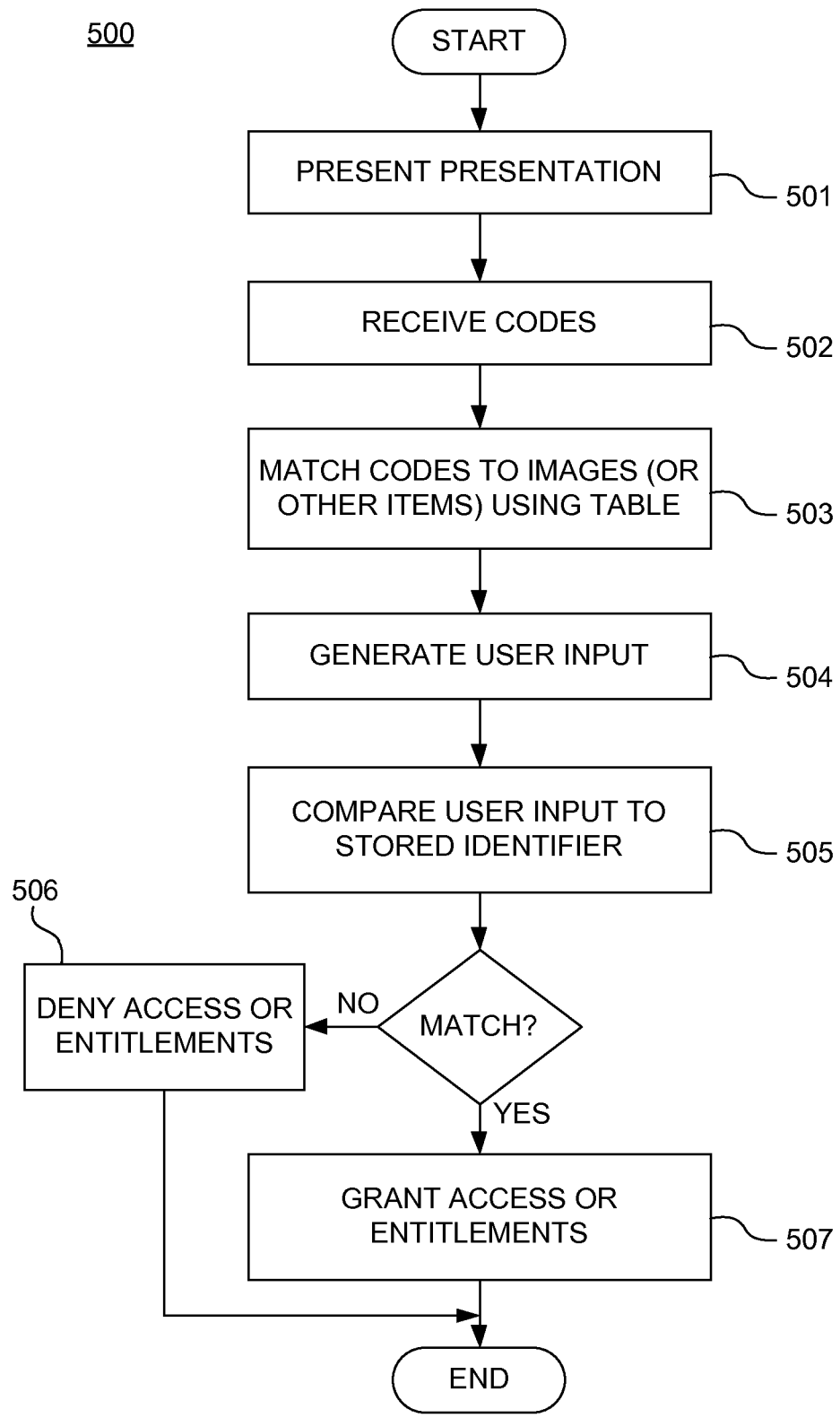
FIG. 5 is a flowchart illustrating an exemplary process for implementing challenge-response authentication by utilizing an interactive graphical presentation.

FIG. 5 is a flowchart illustrating an exemplary process 500 for implementing challenge-response authentication by utilizing an interactive graphical presentation. In general, challenge-response authentication is achieved by presenting user 122 with an interactive presentation, receiving user input via the interactive presentation, and validating the user input against a predetermined user identifier to authenticate user 122. In the following example the presentation is graphical. But it may also be aural or tactile, for example, to accommodate for the visually impaired.

At block 501, security services module 114 communicates the interactive graphical presentation generated at block 304 (FIG. 3), to user 122 via a graphical user interface (GUI) of external terminal 102.

User 122 inputs user data corresponding to an identifier, such as a PIN or password, of user 122 by following instructions that are presented with the interactive graphical presentation. As discussed above in connection with block 304, the method of inputting the user data varies based on the instructions provided. Regardless of the method of inputting the user data, once user 122 has inputted the user data, codes corresponding to the input data are transmitted to security services module 114 at block 502.

As discussed above in connection with block 304, in one embodiment, user 122 inputs user data by clicking on the images in a certain order. In this case, the codes corresponding to the clicked images are transmitted to security services module 114 in the order by which user 122 clicked them.

As discussed above in connection with block 304, in another embodiment, user 122 inputs user data by arranging the images into a certain order. In this case, once user 122 is satisfied with the arrangement, user 122 selects a submit button and the codes corresponding to the arranged images are transmitted to security services module 114 in the order by which user 122 arranged them.

By transmitting codes instead of underlying alphanumeric characters, unlawful recipients of transmitted messages are less likely to be able to discern the underlying characters and hence the identifier (e.g., PIN, password, etc.) of user 122 by intercepting and decoding transmitted data. The security of the identifier is increased by avoiding the need to transmit the identifier and/or store the identifier by any entity other than the financial account issuer. As a result, the user identifier 122 is unexposed to eavesdropping or data tampering, etc. This helps thwart a hacker's attempt to obtain the user identifier by using a keystroke logger or other input monitoring device. Even if the hacker successfully intercepts transmitted messages, the only data exposed to the hacker is the codes, which by virtue of being limited-time-use codes, are not necessarily usable for subsequent transactions.

In one embodiment, TM agent 108a encrypts the codes and transmits the encrypted codes to security services module 114. This provides an added layer of protection against unauthorized access to the identifier of user 122.

Figure 3:
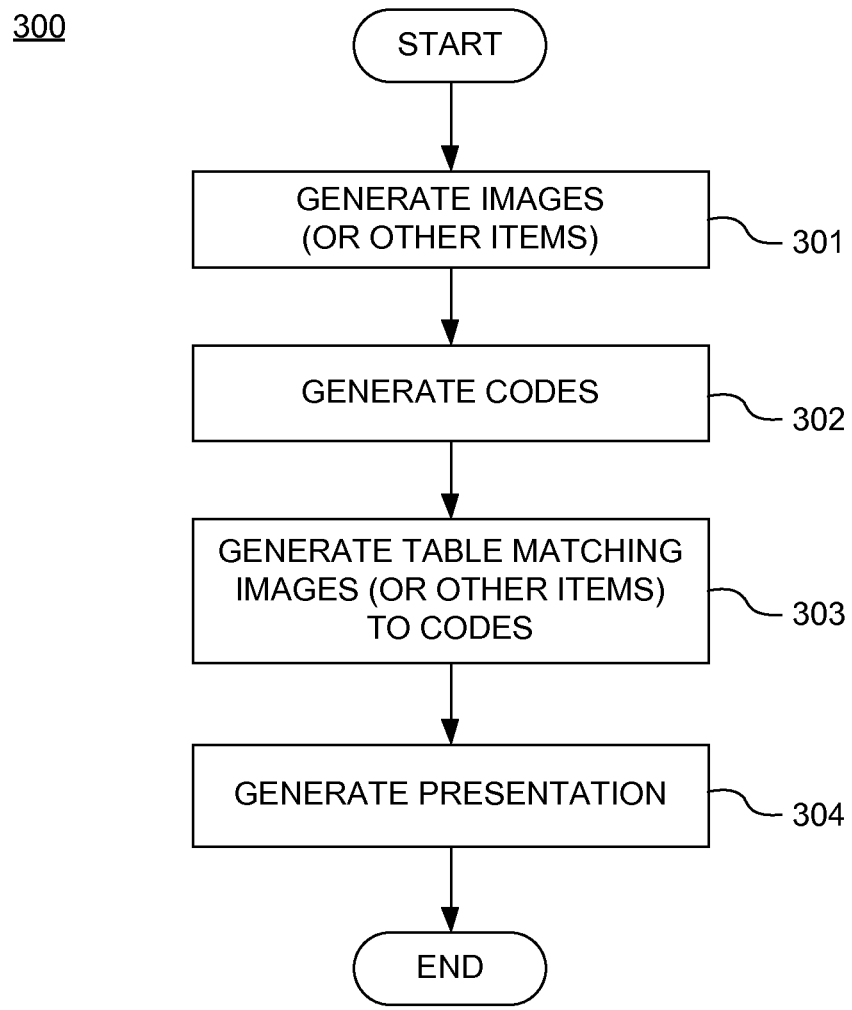
FIG. 3 is a flowchart illustrating an exemplary process for generating an interactive graphical presentation for challenge-response authentication.

At block 503, security services module 114 matches each of the received codes to the corresponding image, or other multimedia item, and the corresponding underlying alphanumeric character using the table generated at block 303 (FIG. 3).

At block 504, security services module 114 forms the user input by concatenating the underlying alphanumeric characters that were matched at block 503 to the codes that were received at block 502, in the order by which they were received.

At block 505, security services module 114 compares the user input formed at block 504 to a user identifier stored in a database (not shown) in association with user 122 registered as the owner of external terminal 102.

If security services module 114 determines that the user input formed at block 504 fails to match the user identifier stored in the database then at block 506 security services module 114 denies user 122 authorization to complete a transaction and/or to access requested account services.

If security services module 114 determines that the user input formed at block 504 matches the user identifier stored in the database then at block 507 security services module 114 grants user 122 authorization to complete a transaction and/or to access requested account services.

IV. Example Implementations

The present invention (e.g., system 100, processes 200, 300, and 500, or any part(s) or function(s) thereof) can be implemented using hardware, software or a combination thereof and can be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 6:
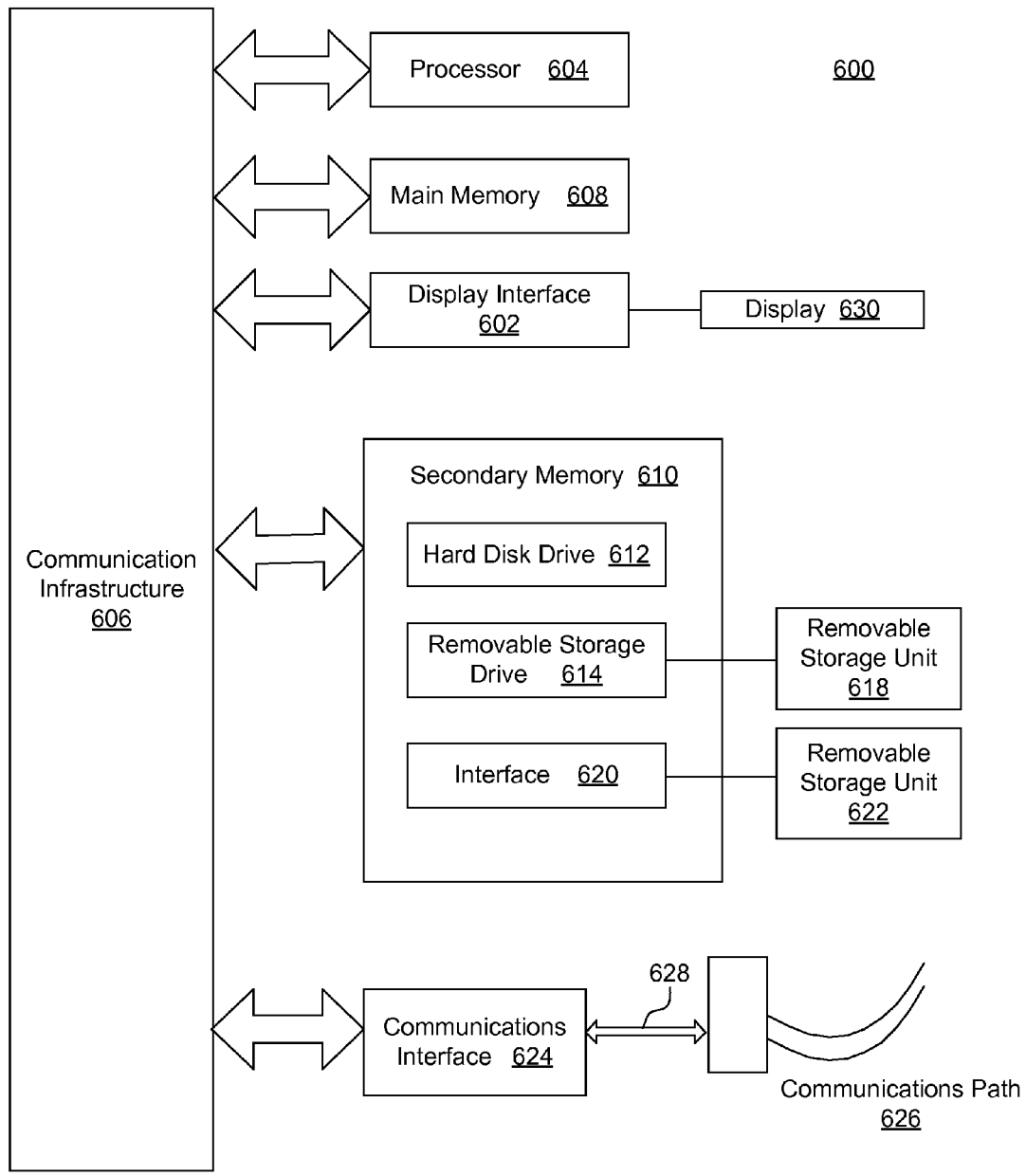
FIG. 6 is a block diagram of an exemplary computer system useful for implementing the present invention.

In fact, in one embodiment, the invention is directed toward one or more computer systems capable of carrying out the functionality described herein. An example of a computer system 600 is shown in FIG. 6.

Computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 can include other similar devices for allowing computer programs or other instructions to be loaded into computer system 600. Such devices can include, for example, a removable storage unit 622 and an interface 620. Examples of such can include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a Personal Computer Memory Card International Association (PCMCIA) slot and card, etc. Software and data transferred via communications interface 624 are in the form of signals 628 which can be electronic, electromagnetic, optical or other signals capable of being received by communications interface 624. These signals 628 are provided to communications interface 624 via a communications path (e.g., channel) 626. This channel 626 carries signals 628 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 614, a hard disk installed in hard disk drive 612, and/or signals 628. These computer program products provide software to computer system 600. The invention is directed to such computer program products.

Computer programs (also referred to as computer control logic) are stored in main memory 608 and/or secondary memory 610. Computer programs can also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software can be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software, with automated and man-in-the-loop operations.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for challenge-response authentication, the method comprising: receiving, by a terminal over a communication network, a plurality of codes and a first arrangement of a plurality of images, each one of the plurality of codes (i) corresponding to one of the plurality of images and (ii) corresponding to an alphanumeric character of a plurality of alphanumeric characters, the plurality of codes being distinct from the plurality of alphanumeric characters; displaying the first arrangement of the plurality of images on a user interface of the terminal; receiving an input through the user interface associated with the plurality of images the input comprising rearranging locations of the plurality of images on the user interface; ordering the plurality of codes in a sequence based on the input received through the user interface; and transmitting, by the terminal over the communication network, the sequence of the plurality of codes, wherein transmitting, by the terminal over the communication network, a request for a service to a service network; and receiving, by the terminal over the communication network, access to the service on the service network when an alphanumeric string matches a user identifier, the alphanumeric string being generated from the plurality of alphanumeric characters based on the sequence of the corresponding the plurality of codes.

2. The method of claim 1, wherein the first arrangement of the plurality of images displayed on the user interface is any one or a combination of: a multidimensional grid of the plurality of images, a horizontal arrangement of the plurality of images, or a spatial overlay of the plurality of images.

3. The method of claim 1, further comprising generating a second arrangement of the plurality of images based on the input received through the user interface, wherein the ordering step includes sequencing the plurality of codes based on the second arrangement of the plurality of images.

4. The method of claim 3, wherein:
the second arraignment includes at least two images of the plurality of images arranged in an order, and
the codes are ordered in the sequence in which the corresponding image is arranged in the second arrangement.

5. The method of claim 1, wherein:
the input received through the user interface includes the selection of at least two images of the plurality of images in an order, and
the sequence of the plurality of codes is based on the order in which the corresponding image was selected.

6. The method of claim 1, further comprising encrypting the sequence of codes transmitted over the communication network.

7. A system for challenge-response authentication, the system comprising: a memory; a user interface; and a processor, coupled to the memory and the user interface, configured to: receive, over a communication network, a plurality of codes and a first arrangement of a plurality of images, each one of the plurality of codes (i) corresponding to one of the plurality of images and (ii) corresponding to an alphanumeric character of a plurality of alphanumeric characters, the plurality of codes being distinct from the plurality of alphanumeric characters; display the first arrangement of the plurality of images on the user interface; receive an input through the user interface associated with the plurality of images, the input comprising rearranging locations of the plurality of images on the user interface; order the plurality of codes in a sequence based on the input received through the user interface; and transmit, over the communication network, the sequence of the plurality of codes, wherein transmitting, by the terminal over the communication network, a request for a service to a service network; and receiving, by the terminal over the communication network, access to the service on the service network when an alphanumeric string matches a user identifier, the alphanumeric string being generated from the plurality of alphanumeric characters based on the sequence of the corresponding the plurality of codes.

8. The system of claim 7, wherein the first arrangement of the plurality of images displayed on the user interface is any one or a combination of: a multidimensional grid of the plurality of images, a horizontal arrangement of the plurality of images, or a spatial overlay of the plurality of images.

9. The system of claim 7, wherein the processor is further configured to:
generate a second arrangement of the plurality of images based on the input received through the user interface, and
sequence the plurality of codes based on the second arrangement of the plurality of images.

10. The system of claim 9, wherein:
the second arraignment includes at least two images of the plurality of images arranged in an order, and
the codes are ordered in the sequence in which the corresponding image is arranged in the second arrangement.

11. The system of claim 7, wherein:
the input received through the user interface includes the selection of at least two images of the plurality of images in an order, and
the sequence of the plurality of codes is based on the order in which the corresponding image was selected.

12. The system of claim 7, wherein the processor is further configured to:
transmit, over the communication network, a request for a service to a service network; and
receive, over the communication network, access to the service on the service network when an alphanumeric string matches a user identifier, the alphanumeric string being generated from the plurality of alphanumeric characters based on the sequence of the corresponding the plurality of codes.

13. The system of claim 7, wherein the processor is further configured to encrypt the sequence of codes transmitted over the communication network.

14. A non-transitory computer-readable medium having stored thereon sequences of instructions, the sequences of instructions including instructions, which, when executed by a computer system, cause the computer system to: receive, over a communication network, a plurality of codes and a first arrangement of a plurality of images, each one of the plurality of codes (i) corresponding to one of the plurality of images and (ii) corresponding to an alphanumeric character of a plurality of alphanumeric characters, the plurality of codes being distinct from the plurality of alphanumeric characters; display the first arrangement of the plurality of images on a user interface; receive an input through the user interface based on the plurality of images, the input comprising rearranging locations of the plurality of images on the user interface; order the plurality of codes in a sequence associated with the input received through the user interface; and transmit, over the communication network, the sequence of the plurality of codes, wherein transmitting, by the terminal over the communication network, a request for a service to a service network; and receiving, by the terminal over the communication network, access to the service on the service network when an alphanumeric string matches a user identifier, the alphanumeric string being generated from the plurality of alphanumeric characters based on the sequence of the corresponding the plurality of codes.

15. The non-transitory computer readable medium of claim 14, wherein the first arrangement of the plurality of images displayed on the user interface is any one or a combination of: a multidimensional grid of the plurality of images, a horizontal arrangement of the plurality of images, or a spatial overlay of the plurality of images.

16. The non-transitory computer readable medium of claim 14, the sequences of instructions including instructions, which, when executed by a computer system, further cause the computer system to:
generate a second arrangement of the plurality of images based on the input received through the user interface, and
sequence the plurality of codes based on the second arrangement of the plurality of images.

17. The non-transitory computer readable medium of claim 16, wherein:
the second arraignment includes at least two images of the plurality of images arranged in an order, and
the codes are ordered in the sequence in which the corresponding image is arranged in the second arrangement.

18. The non-transitory computer readable medium of claim 14, wherein:
the input received through the user interface includes the selection of at least two images of the plurality of images in an order, and
the sequence of the plurality of codes is based on the order in which the corresponding image was selected.

19. The non-transitory computer readable medium of claim 14, the sequences of instructions including instructions, which, when executed by a computer system, further cause the computer system to:
transmit, over the communication network, a request for a service to a service network; and
receive, over the communication network, access to the service on the service network when an alphanumeric string matches a user identifier, the alphanumeric string being generated from the plurality of alphanumeric characters based on the sequence of the corresponding the plurality of codes.

20. The non-transitory computer readable medium of claim 14, the sequences of instructions including instructions, which, when executed by a computer system, further cause the computer system to encrypt the sequence of codes transmitted over the communication network.

* * * * *

UNITED STATES PATENT AND TRADEMARK OFFICE
CERTIFICATE OF CORRECTION

PATENT NO. : 9,847,995 B2
APPLICATION NO. : 14/933165
DATED : December 19, 2017
INVENTOR(S) : Samuel A. Bailey, Jr.

It is certified that error appears in the above-identified patent and that said Letters Patent is hereby corrected as shown below:

In the Claims

Column 16, Line 31, please delete "arraignment" and insert therefor --arrangement--

Column 17, Line 17, please delete "arraignment" and insert therefor --arrangement--

Column 18, Line 27, please delete "arraignment" and insert therefor --arrangement--

Signed and Sealed this
Twenty-fourth Day of July, 2018

Andrei Iancu
*Director of the United States Patent and Trademark Office*